May 7, 1940.  O. SIEBLER ET AL  2,199,896
SPRINGING ARRANGEMENT
Filed Aug. 25, 1936
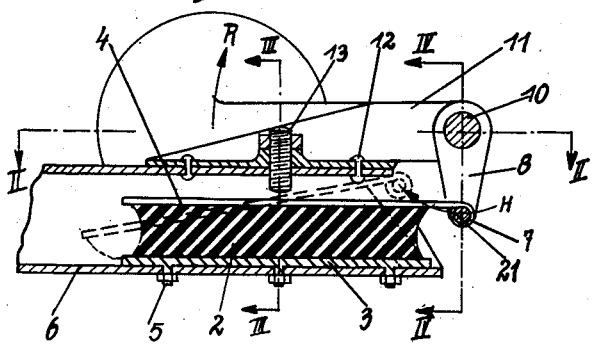
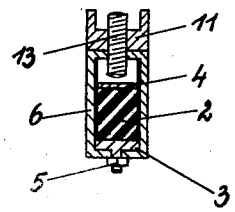
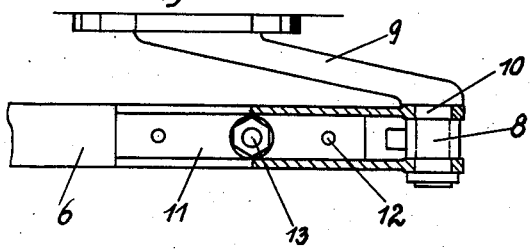
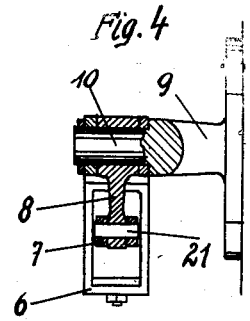
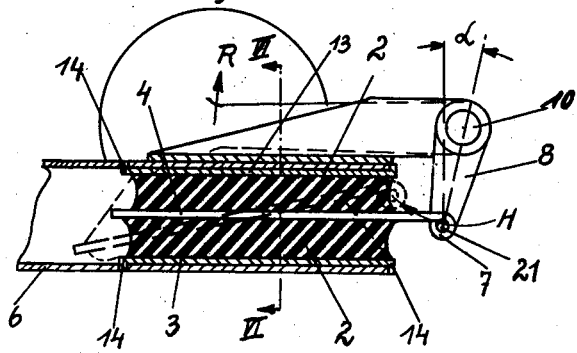
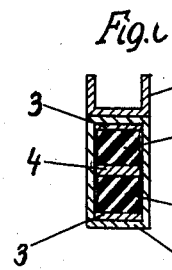
O. Siebler & W. Boxan
Inventors
By Glascock Downing & Seebold
Attys.

Patented May 7, 1940

2,199,896

UNITED STATES PATENT OFFICE 2,199,896

SPRINGING ARRANGEMENT

Oscar Siebler and Walter Boxan, Zschopau, Germany, assignor to Auto Union Aktiengesellschaft, Chemnitz, Germany Application August 25, 1936, Serial No. 97,856
In Germany August 28, 1935

7 Claims. (Cl. 267—21)

The invention relates to a springing arrangement, more particularly for automobiles with swinging link members carrying the wheels and using rubber members stressed in shear.

Such rubber members have hitherto been made in the form of sleeves extending in the direction of the link member journals and distorted by a rotary movement. In these constructions the material is not uniformly utilized, because the inner and outer shear surfaces are of different sizes. The transmission ratio between the power and the load is predetermined and fixed by the length of the link member. The link member journal passing through the rubber sleeve must be of considerable length and must have two bearings, which involves considerable expense. Also such rubber sleeves are difficult to manufacture and fix.

In contradistinction thereto the novelty of the invention consists in this, that the rubber members are constructed in the form of prisms extending in the mean direction of movement of the link member. The rubber members in this case are deformed by a movement which takes place in the axis of the prisms. The material can, in this case, be uniformly utilized because all the shear surfaces are equal. Fundamentally, any ratio of transmission between the power and the load is possible, so that very hard rubber materials can be used. Such rubber members are simply made and easily fixed. The constructional expense for mounting them is only small, on account of the prismatic shape. According to the invention the rubber members are provided with adhering plates, which are releasably connected at one side with the frame and at the other side with the link member. In this way it is made possible easily to insert and remove the rubber members without damage.

Rubber members of prismatic form are already known, for example for engines and gears of automobiles. In these constructions however, the rubber members serve only for providing a vibrationless mounting or for damping the oscillations. They must, as a rule, be so greatly stressed that their springing properties remain small.

Several constructional examples of the invention are illustrated in the accompanying drawing.

Fig. 1 is a vertical principal section through the first spring arrangement,

Figs. 2-4 are corresponding sections along the lines II—II, III—III and IV—IV in Fig. 1, Fig. 5 is a vertical principal section through a second spring arrangement, Fig. 6 is a corresponding section along the line VI—VI in Fig. 5.

In the constructional example according to Figs. 1-4 the rubber body 2 is made prismatic and is connected with two plates 3, 4, so as to adhere firmly. The lower plate 3 is secured by means of screw bolts 5 to the lower web of the box-like longitudinal frame member 6. The upper plate 4 is constructed as a spring plate and is pivoted by means of a spring eye 7 to the short arm 8 of the wheel link member 9. The arm 8 is provided with a pin 21 to which the plate 4 is pivotally connected. The link member 9 is guided by means of a journal 10 in a bracket 11 secured by means of rivets 12 to the upper web of the longitudinal frame member 6. In the bracket 11 is mounted an adjustable screw bolt 13, which strikes against the plate 4 in such a manner that this tilts inwardly when the link member arm 8 swings. The rubber member 2 is enclosed in the rear end of the frame member 6.

If the wheel swings upwardly in the direction R, the plate 4 is moved forwardly by the arm 8 in the direction H. Since the spring eye 7 also moves upwardly relative to the frame member 6, the plate 4 is simultaneously turned about the screw bolt 13. In addition to the shear stress in the direction H of the movement of the arm 8, there are also tension and compression stresses in the vertical direction. This causes the springing to be harder the greater is the wheel deflection, so that a progressive springing characteristic is obtained. The amount of progressiveness can be varied within any desired limits by adjusting the point 13 and in this way the running requirements can be met. Also the natural damping of the springing arrangement can be influenced by giving the rubber member 2 a certain initial tension in the direction perpendicular to the direction H.

In the constructional example according to Figs. 5 and 6 instead of a single prismatic rubber member, two superposed rubber members are used, which are inserted with a small initial tension between the upper and lower webs of the frame member 6. The plates 3 are secured axially in the frame member 6 by means of hooks 14. If in this arrangement the wheel swings in the direction R, the plate 4 is moved inwardly and at the same time can tilt, and an alternate compression and tension stressing being superposed on the shear stressing of the rubber member 2. The springing in this case becomes more progressive the greater is the angle α between the forwardly disposed arm 8 and the vertical.

The prismatic rubber members can also have other shapes, which are determined by the construction of the longitudinal frame member and of the link member. The essential feature of the invention is that the longitudinal axis of the prismatic rubber member approximately coincides with the direction of movement of the engaging arm of the link member. The length of the engaging link member arm is immaterial for the invention.

What we claim is:

1. A yieldable suspension device for a wheel of a vehicle provided with a frame comprising, a wheel-carrying link member journalled for movement with respect to the frame, a pin carried by the link member spaced from the journal so as to provide a lever arm which swings in an arcuate path when the wheel causes the link member to pivot with respect to the frame, a rubber member in the form of a solid prism having one face thereof fixed relative to the frame, a plate secured to the opposite face of the rubber member and pivotally connected to said pin, said plate being arranged to be translated linearly during springing of the wheel by movement of said lever arm whereby linear translation of the plate member is opposed by shear resistance of the rubber member.

2. In a yieldable suspension device according to claim 1 wherein the plate consists of a leaf spring which terminates in an eye for pivotal connection with the pin.

3. A yieldable suspension device for a wheel of a vehicle provided with a frame having a flat portion comprising, a bracket fixed to the frame and having a bearing therein, a wheel-carrying link member journalled in the bearing, a pin carried by the link member spaced from the axis of the bearing providing a lever arm which swings in a circular path when the wheel turns the link member in the bearing, an elongated rubber member having at least two parallel opposite faces arranged along the frame with one face of the rubber member secured to the flat portion of the frame, an adhering plate arranged lengthwise along the opposite face of the rubber member and having one end thereof connected to turn on said pin, said pin being so arranged with respect to the bearing and the normal position of the link member that said plate is moved in the direction of the length of the rubber member upon initial springing of the wheel, which movement is opposed by the shear resistance of the rubber member and said plate is tilted upon further movement of the link member whereby a portion of the rubber member between the plate and the frame is compressed and another portion is tensioned to additionally oppose the springing of the wheel.

4. In a yieldable suspension device for a wheel of a vehicle including a frame having a hollow open end portion, a bracket fixed to the end of the frame and having a bearing, a wheel-carrying link member journalled in the bearing, an integral arm projecting from the link member so as to extend across the end of the frame when the link member is in a normal position, a rubber member arranged within the end portion of the frame, one face of said rubber member being immovable with respect to the frame, a plate secured to an opposite face of the rubber member and pivotally connected to said arm, and adjustable means carried by the frame adapted to be engaged by said plate during the swinging of said arm so as to provide a positive pivot for said plate.

5. In a yieldable suspension device for a wheel of a vehicle provided with a frame having a flat end portion, a bracket fixed to the end of the frame and having a bearing therein, a wheel-carrying link member journalled in the bearing, an integral arm projecting from the link member so as to extend transversely with respect to the frame, a rubber member in the form of a prism and having at least two relatively flat opposite faces, one of said faces being fixed along the flat end portion of the frame, a plate secured to the other flat face of said rubber member and pivotally connected to said arm, and adjustable means carried by the frame adapted to be engaged by the intermediate portion of said plate during springing of the wheel so as to provide a positive pivot for the plate when moved by said arm.

6. In a yieldable suspension device for a wheel of a vehicle including a frame having a hollow open end portion, a bracket fixed to the end of the frame and having a bearing, a wheel-carrying link member journaled in the bearing, an integral arm projecting from the link member so as to extend across the end of the frame when the link member is in a normal position, a rubber member arranged within the end portion of the frame, one face of said rubber member being immovable with respect to the frame, a plate secured to an opposite face of the rubber member and pivotally connected to said arm, and a bolt threaded through said frame so as to be engaged by an intermediate portion of said plate during movement of the arm in response to springing of the wheel whereby the end portion of the bolt provides a positive pivot for said plate.

7. A yieldable suspension device for a wheel of a vehicle including a frame having a hollow open end portion comprising, a bracket fixed to the end of the frame and having a bearing therein, a wheel carrying link member journaled in the bearing, an integral arm projecting from the journaled portion of the link member so as to extend angularly across the end of the frame when the link member is in a normal position, two rubber members arranged within the end portion of the frame, each rubber member having one face secured to the frame, a plate extending between the rubber members adhering to each of the rubber members and pivotally connected to said arm whereby said plate moves linearly during the initial springing movement of the link member to subject the rubber members to shearing stresses and said plate being tilted upon further springing of the wheel to compress portions of the rubber members and tension other portions.

OSCAR SIEBLER.
WALTER BOXAN.